United States Patent
Lee

(10) Patent No.: US 8,368,778 B2
(45) Date of Patent: Feb. 5, 2013

(54) IMAGE-SIGNAL PROCESSOR CAPABLE OF SUPPORTING A PLURALITY OF CCD IMAGE SENSORS AND METHOD FOR PROCESSING IMAGE SIGNALS USING THE IMAGE-SIGNAL PROCESSOR

(75) Inventor: Jung won Lee, Seoul (KR)

(73) Assignee: SEMISOLUTION Inc., Seougnam (KR)

( * ) Notice: Subject to any disclaimer, the term of this patent is extended or adjusted under 35 U.S.C. 154(b) by 224 days.

(21) Appl. No.: 12/919,384

(22) PCT Filed: Mar. 10, 2009

(86) PCT No.: PCT/KR2009/001192
§ 371 (c)(1),
(2), (4) Date: Aug. 25, 2010

(87) PCT Pub. No.: WO2009/113800
PCT Pub. Date: Sep. 17, 2009

(65) Prior Publication Data
US 2011/0007184 A1    Jan. 13, 2011

(30) Foreign Application Priority Data

Mar. 10, 2008  (KR) .................. 10-2008-0022058
Aug. 20, 2008  (KR) .................. 10-2008-0081597

(51) Int. Cl.
H04N 5/335    (2011.01)
H04N 5/76    (2006.01)
(52) U.S. Cl. .................. 348/231.99; 348/312
(58) Field of Classification Search .......... 348/231.99, 348/312, 294, 222.1, 279, 271, 272, 273, 348/234, 237, 441, 443, 445, 446
See application file for complete search history.

(56) References Cited

U.S. PATENT DOCUMENTS

| | | | | |
|---|---|---|---|---|
| 4,876,590 | A * | 10/1989 | Parulski | 348/333.11 |
| 5,734,427 | A * | 3/1998 | Hayashi | 348/333.11 |
| 6,373,523 | B1 | 4/2002 | Jang | |
| 7,839,447 | B2 * | 11/2010 | Mizutani et al. | 348/333.11 |
| 2002/0003578 | A1 * | 1/2002 | Koshiba et al. | 348/273 |
| 2002/0008780 | A1 * | 1/2002 | Han | 348/441 |
| 2003/0146996 | A1 * | 8/2003 | Ide | 348/273 |
| 2006/0007353 | A1 * | 1/2006 | Matsutani et al. | 348/441 |

(Continued)

FOREIGN PATENT DOCUMENTS

EP    1 628 472    2/2006

OTHER PUBLICATIONS

International Search Report issued in PCT/KR2009/001192 dated Jul. 16, 2009.

*Primary Examiner* — Aung S Moe
(74) *Attorney, Agent, or Firm* — KED & Associates, LLP

(57) ABSTRACT

An image-signal processor may be provided to support CCD image sensors. A timing generator may provide timing signals to CCD image sensors, to enable each of the CCD image sensors to output captured-image data in form of an analog signal that a corresponding A/D converter converts into a CYMG signal. Image-processing parts may receive the CYMG image signal from the A/D converter and convert the CYMG image signal into an YCbCr signal. An image-combination part may combine horizontally or vertically images in form of the YCbCr signal into a combination image and store the combination image in an internal memory, and scale down horizontally or vertically the combination image while reading out the combination image from the internal memory, storing the scaled-down combination image in an external memory, and outputting the scaled-down combination image in form of an YCbCr signal.

6 Claims, 5 Drawing Sheets

U.S. PATENT DOCUMENTS

| | | |
|---|---|---|
| 2006/0109358 A1* | 5/2006 | Song et al. .................... 348/279 |
| 2006/0256236 A1* | 11/2006 | Kume et al. ................... 348/441 |
| 2006/0284989 A1* | 12/2006 | Kang et al. .................. 348/222.1 |
| 2009/0160969 A1* | 6/2009 | Kuroiwa .................... 348/222.1 |

* cited by examiner

IMAGE-SIGNAL PROCESSOR CAPABLE OF SUPPORTING A PLURALITY OF CCD IMAGE SENSORS AND METHOD FOR PROCESSING IMAGE SIGNALS USING THE IMAGE-SIGNAL PROCESSOR

TECHNICAL FIELD

The present invention relates to an image-signal processor, and more particularly to an image-signal processor capable of supporting a plurality of CCD image sensors.

BACKGROUND ART

Generally, a conventional image-signal processor (ISP) performs a digital image processing on an image captured by one CCD image sensor.

As shown in FIG. 1, the conventional image-signal processor (ISP) includes first and second image-processing parts. An A/D converter (ADC) converts an analog image signal sent out from the CCD image sensor, into a CYMG image signal. The first image-processing part converts the CYMG image signal into an YCbCr signal. The second image-processing part converts the YCbCr into a YUV signal. Subsequently, an encoder converts the YUV signal into an NTSC/PAL signal for TV display.

In this configuration, the conventional image-signal processor supports only one CCD image sensor. So, two or more cameras, each with the CCD image sensor, are installed to monitor two or more areas simultaneously or one area in a wide range. Images captured by the two or more CCD image sensors have to be digitally processed to be simultaneously displayed on a single monitor. To do this, a video multiplexer is used which receives as many image signals as input from the corresponding cameras, and sends out one image signal as an output, thereby displaying one image consisting of the small-sized captured images on a single monitor.

Generally, the camera includes the CCD image sensor, the A/D converter and the image-signal processor. The image-signal processor includes a timing generation part and an image-signal processing part. An image signal output from the image-signal processor is converted into the NTSC/PAL signal for TV display, thereby displaying the captured image on a monitor. Installation of the cameras to monitor a certain area is on increasing demand. However, the more the area there is to monitor at the same time, the more the camera is required to be installed. This requires additional installation of the image-signal processor in each of the CCD image sensors.

DISCLOSURE OF INVENTION

Technical Solution

An object of the present invention is to provide an image-signal processor capable of supporting a plurality of CCD image sensors.

Another object of the present invention is to provide a method for processing image signals using an image-signal processor capable of supporting a plurality of CCD image sensors.

According to an aspect of the present invention, there is provided an image-signal processor capable of supporting a plurality of CCD image sensors, including, a timing generator providing timing signals, each with the same phase, to the at least two CCD image sensors, to enable each of the CCD image sensors to output captured-image data in the form of an analog signal which a corresponding A/D converter converts into a CYMG signal; at least two image-processing parts, each of which receives the CYMG image signal from the A/D converter and converts the CYMG image signal into an YCbCr signal through application of color interpolation; an image-combination part combining horizontally or vertically at least two images being in the form of the YCbCr signal into a combination image and then storing the combination image in an internal memory, and, at the same time, scaling down horizontally or vertically the combination image while reading out the combination image from the internal memory, storing the scaled-down combination image in an external memory, and then outputting the scaled-down combination image in the form of an YCbCr signal from the external memory; and an image-conversion part converting the YCbCr signal to an YUV signal for TV output.

According to another aspect of the present invention, there is provided an method for processing image signals using an image-signal processor capable of supporting a plurality of CCD image sensors, including, a first step of providing timing signals, each with the same phase, to the at least two CCD image sensors, to enable each of the CCD image sensors to output captured-image data in the form of an analog signal which a corresponding A/D converter converts into the CYMG signal; a second step of receiving the at least two CYMG image signals from the at least two A/D converters and converting a CYMG image signals into YCbCr signals through application of color interpolation; a third step of combining horizontally or vertically at least two images being in the form of the YCbCr signal into a combination image and then storing the combination image in an internal memory, and, at the same time, scaling down horizontally or vertically the combination image while reading out the combination image from the internal memory, storing the scaled-down combination image in an external memory, and then outputting the scaled-down combination image in the form of an YCbCr signal from the external memory; and a fourth step of converting the YCbCr signal to an YUV signal for TV output.

The foregoing and other objects, features, aspects and advantages of the present invention will become more apparent from the following detailed description of the present invention when taken in conjunction with the accompanying drawings.

BRIEF DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

In the drawings.

MODE FOR THE INVENTION

Hereinafter, exemplary embodiments of the present invention will be described in detail with reference to the attached drawings.

According to the present invention, images captured by two or more CCD image sensors can be horizontally and/or vertically combined in one image to be displayed on a single monitor.

Figure 1:
FIG. 1A is a block diagram of configuration of an conventional image-signal processor.
Figure 2:
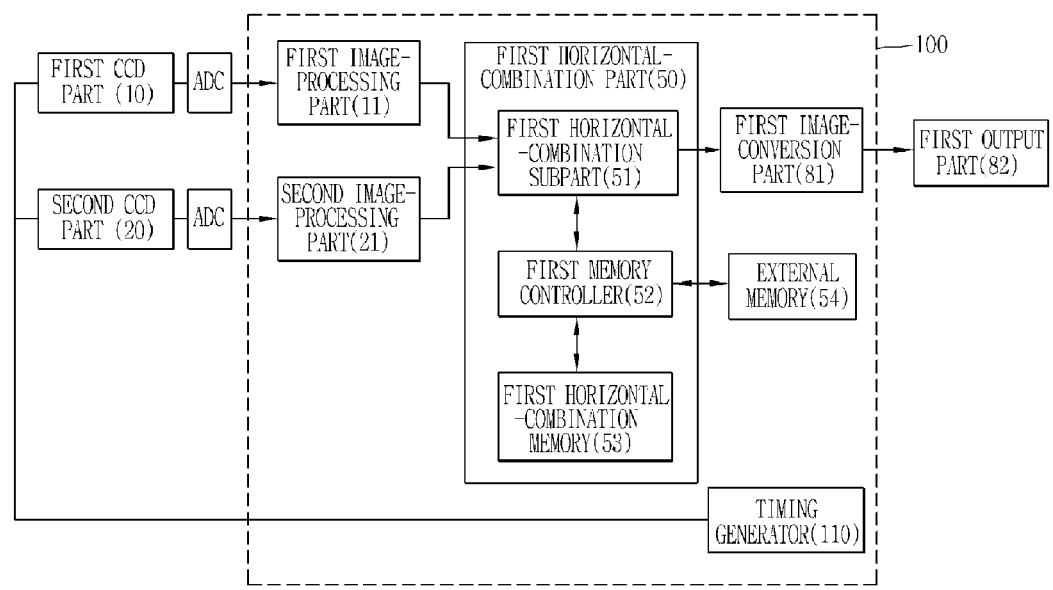
FIG. 2 is a block diagram of a first embodiment of the image-signal processor according to the present invention.
Figure 3:
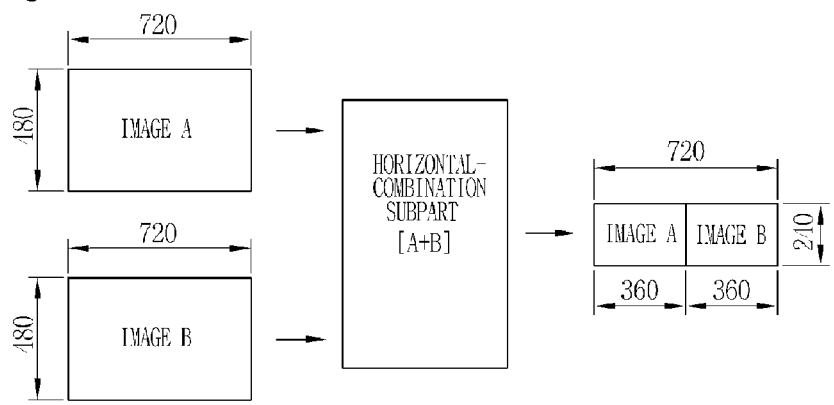
FIG. 3 is a view illustrating that the image-signal processor horizontally combines the two images captured by the two CCD image sensors into a scaled-down horizontal-combination image.

FIG. 2 is a block diagram of a first embodiment of the image-signal processor according to the present invention. FIG. 3 is a view illustrating that the image-signal processor horizontally combines the two images captured by the two CCD image sensors into a scaled-down horizontal-combination image.

Referring to FIGS. 2 and 3, the first embodiment of the image-signal processor is now described. As shown in FIGS. 2 and 3, the two images captured by the two CCD image sensors is through the A/D converter input to the image-signal processor 100.

The image-signal processor 100 includes first and second image-processing parts 11 and 21, a first horizontal-combination part 50, and a first image-conversion part 81. The two cameras, each with the CCD image sensor, are initially set to capture images of two different areas, respectively. Each CCD image sensor, provided on first and second CCD parts 10 and 20, has a CYMG color array.

Cy, Ye, Mg, and G information, stored in pixels of each of the CCD image sensor is output in the form of an analog image signal to the A/D converter, through a video-out port of the CCD image sensor. The A/D converter converts the analog image signal to a CYMG image signal. The two different CYMG image signals are input to the first and second image-processing parts 11 and 21, respectively.

Each of the first and second image-processing parts 11 and 21 converts the CYMG image signal to an YCbCr signal, through application of color interpolation, respectively.

As shown in FIGS. 2 and 3, the YCbCr signal for an image A of 720×480 pixels output from the first image-processing part 11 and the YCbCr signal for an image B of 720×480 pixels output from the second image-processing part 21 are input to a first horizontal-combination subpart 51 of the first horizontal-combination part 50.

Operations of horizontally combining the images A and B into a combination image [A+B] and scaling down the combination image [A+B] are now described.

A first memory controller 52 controls a first horizontal-combination memory 53 (internal memory) to combine the two images A and B. The first horizontal-combination memory 53 includes 4×2 FIFO memories, 4 for 4 lines of the image A and 4 for 4 lines of the image B. The 8 FIFO memories are arranged in 4 rows and 2 columns.

The images A and B are horizontally combined into a horizontal-combination image, line by line. One pixel of each of the images A and B consists of the YCbCr signal.

An odd line (720+720) of the horizontal-combination image is stored in the first row of the corresponding FIFO memories 53 and an even line (720 +720) of the horizontal-combination image is stored in the second row of the FIFO memories 53. The next odd line (720+720) of the horizontal combination image is stored in the third row of the corresponding FIFO memories 53 and the next even line (720+ 720) of the horizontal-combination image is stored in the fourth row of the FIFO memories 53.

In this manner, the horizontal-combination image is stored in the unit of 4 (720+720) lines (odd, even, odd, and even lines) in the 4×2 FIFO memories 53.

While being read out from the 4×2 FIFO memories 53, the 4 lines of the horizontal-combination image are horizontally scaled down and then are stored in an external memory 54. That is, the 4 lines of the horizontal-combination image are read out from the 4×2 FIFO memories 53 for scale-down and at the same time the 4 lines are in sequence stored in the 4×2 FIFO memories 53, in a repetitive manner.

The 4 lines of the scaled-down horizontal-combination image are output from the external memory 54 to the first image-conversion part 81.

As a result, the horizontal-combination image of 1440× 480 pixels is scaled down to 720×240 pixels. The scaled-down horizontal-combination image of 720×240 pixels stored in the external memory 54 is output in real time to the first image-conversion part 81 in the form of an YCbCr signal.

The first image-conversion part 81 converts the YCbCr signal input from the first image-combination part 50 to a YUV signal. The YUV signal is output in the form of a TV signal through a first output part 82.

Figure 5:
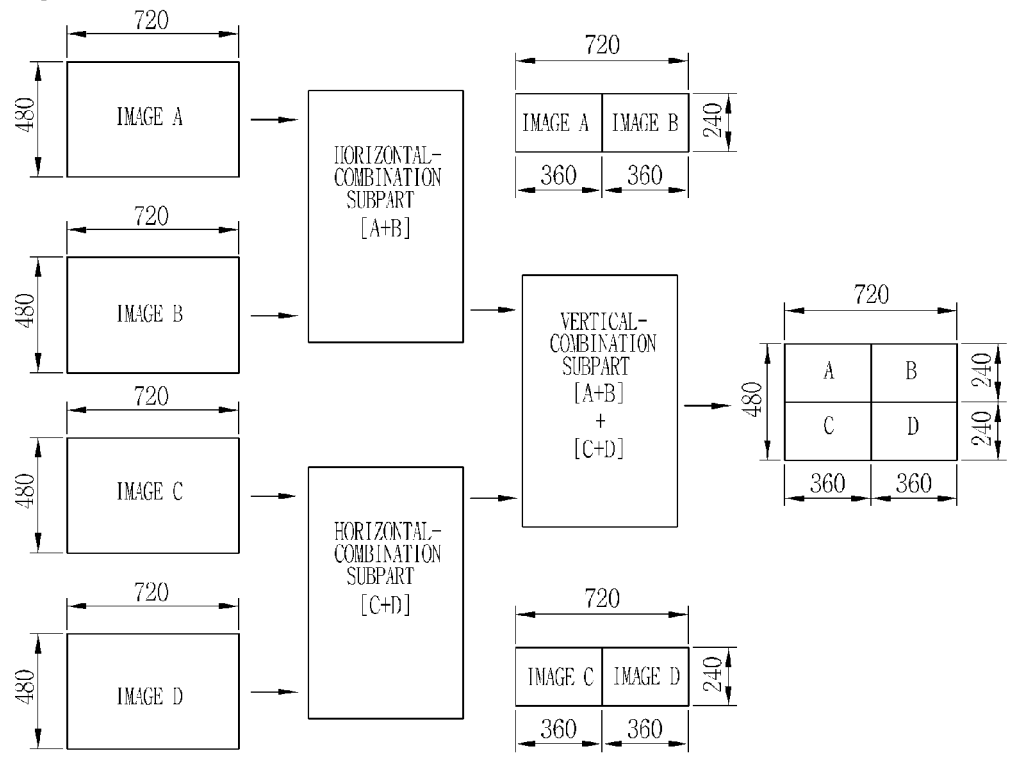
FIG. 5 is a view illustrating that the image-signal processor according to the second embodiment of the present invention horizontally and vertically combines four images, captured by the CCD image sensors, into a single image.

The timing generator 110 provides timing signals, each with the same phase, to the CCD image sensors, to enable each of the CCD image sensors to output captured-image data (Cy, Ye, Mg, and G information) in the form of an analog signal to the corresponding A/D converter. FIG. is a block diagram of a second embodiment of the image-signal processor according to the present invention. FIG. 5 is a view illustrating that the image-signal processor 100 according to the second embodiment of the present invention horizontally and vertically combines four images, captured by the CCD image sensors, into a single image.

Figure 4:
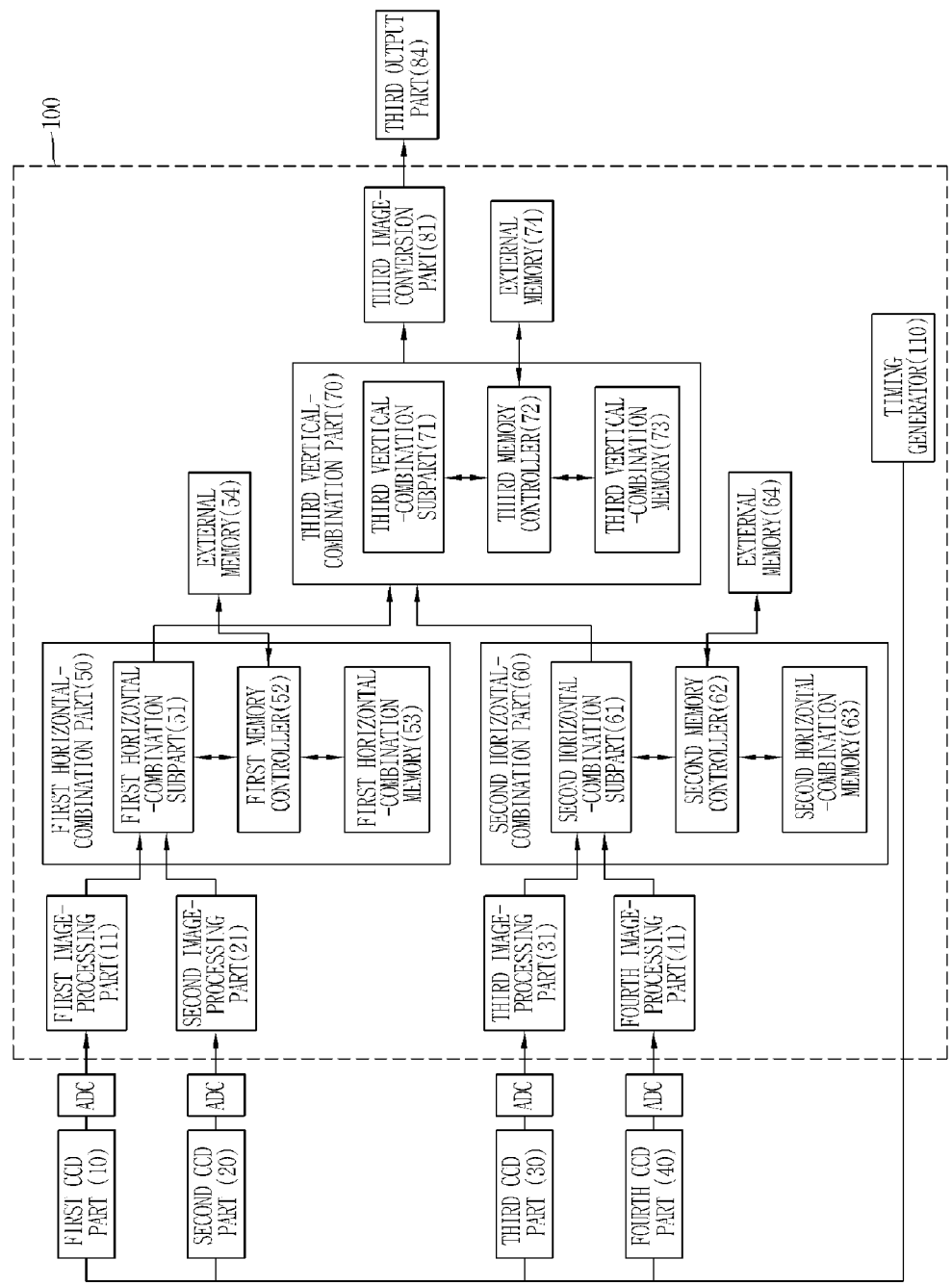
FIG. 4 is a block diagram of a second embodiment of the image-signal processor according to the present invention.

Referring to FIGS. 4 and 5, the second embodiment of the image-signal processor 100 is now described.

Each CCD image sensor, installed on first, second, third, and fourth CCD parts 10, 20, 30 and 40 has a CYMG color array.

Cy, Ye, Mg, and G information, stored in pixels of each of the CCD image sensor is output in the form of the analog image signal, through a video-out port of the CCD image sensor to the A/D converter. The A/D converter converts the analog image signal to the CYMG image signal. The four different CYMG image signals are input to the first, second, third, and fourth image-processing parts 11, 21, 31 and 41, respectively.

Each of the first, second, third, and fourth image-processing parts 11, 21, 31 and 41 converts the CYMG image signal into an YCbCr signal, through application of color interpolation, respectively.

As shown in FIGS. 4 and 5, the YCbCr signal for an image A of 720×480 pixels output from the image-processing part 11 and the YCbCr signal from an image B of 720×480 pixels output from the second image-processing part 21 are input to a first horizontal-combination subpart 51 of the first horizontal-combination part 50, and is horizontally combined into a horizontal-combination image of 720×240 pixels.

Operations of horizontally combining the images A and B into a combination image [A+B] and scaling down the combination image [A+B] are the same as in the first embodiment of the present invention. Therefore, description of operations of horizontally combining the images A and B is omitted.

The YCbCr signal for an image C of 720×480 pixels output from the image-processing part 31 and the YCbCr signal from an image D of 720×480 pixels output from the second image-processing part 41 are input to a second horizontal-combination subpart 61 of the second horizontal-combination part 60, and is horizontally combined into a horizontal-combination image of 720×240 pixels.

Operations of horizontally combining the images C and D into a combination image [A+B] and scaling down the combination image [C+D] are the same as in the first embodiment of the present invention. Therefore, description of operations of horizontally combining the images C and D is omitted.

As shown in FIG.5, two scaled-down horizontal-combination images [A+B] and CD of 720×240 pixels are input in the form of the YCbCr signals to a third vertical-combination subpart 71 of a third vertical-combination part 70. A third memory controller 72 controls a third vertical-combination memory 73 (internal memory) to combine the two scaled-down horizontal-combination images [A+B] and [C+D] of 720×240 pixels, line by line. The third vertical-combination memory 73 includes 4×1 FIFO memories, 2 for 2 lines of the scaled-down horizontal-combination image [A+B] and 2 for 2 lines of the scaled-down horizontal-combination image [C+D].

2 lines of the scaled-down horizontal-combination image [A+B] are stored in the first and second FIFO memories 73, and 2 lines of the scaled-down horizontal-combination image [C+D] are stored in the third and fourth FIFO memories 73. In this manner, the two scaled-down horizontal-combination images [A+B] and [C+D] are stored in the unit of 4 lines (2 lines of the scaled-down horizontal-combination image [A+B]+2 lines of the scaled-down horizontal-combination image [C+D] in the 4×1 FIFO memories 73. While being read out from the FIFO memories (internal memories), 2 lines of the scaled-down horizontal-combination image [A+B] are vertically scaled down and are stored in an external memory 74. While being read out from the FIFO memories (internal memories), 2 lines of the scaled-down horizontal-combination image [C+D] are vertically scaled down and are stored in the external memory 74, in a repetitive manner.

2 lines of the scaled-down horizontal-combination image [A+B] being vertically scaled down and 2 lines of the scaled-down horizontal-combination image [C+D] being vertically scaled down make up of a scaled-down horizontal-and-vertical combination image. The scaled-down horizontal-and-vertical combination image is output in the form of an YCbCr from the external memory 74 to the image-conversion part 81. In this manner, as shown in FIG.5, the scalded-down horizontal/vertical combination image of 720×480 pixels is generated which is to be displayed on a single TV screen.

The timing generator 110 should provide timing signals, each with the same phase, to the CCD image sensors at the same time, for their synchronic control. When this is done, Cy, Ye, Mg, and G information is output in the form of the analog signal from each of the CCD image sensors. Accordingly, each A/D converter converts the analog signal into the CYMG image signal.

Figure 6:
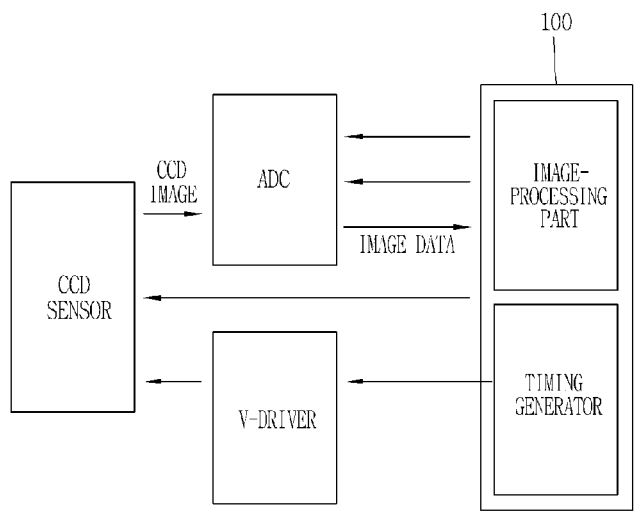
FIG. 6 is a view illustrating that the timing generator sends out a timing signal to a single CCD image sensor.

FIG. 6 is a view illustrating that the timing generator sends out a timing signal to a single CCD image sensor.

As shown in FIG. 6, Cy, Ye, Mg, and G information is output in the form of the analog signal from the CCD image sensor. The A/D converts the analog signal to the CYMG image signal. At this point, the timing generator 110 provides a horizontal timing synchronization signal directly to the CCD image sensor and a vertical timing synchronization signal through a V-driver to the CCD image sensor at the same time.

Control signals that the timing generator 110 of the image-signal processor 100 provides to the A/D Converter includes Serial Load Pulse (SL), Serial Data In (SDATA), Serial Clock In (SCK), DATA CLK (Desiral Data Output latch Clock), PBLK (Preblanking Clock Input), CLPOB (Black Level Clamp Clock Input), SHP (CDS Sampling clock for CCD Reference level), SHD (CDS Sampling Clock for CCD Data Level), Spare 1 and Spare 2.

Figure 7:
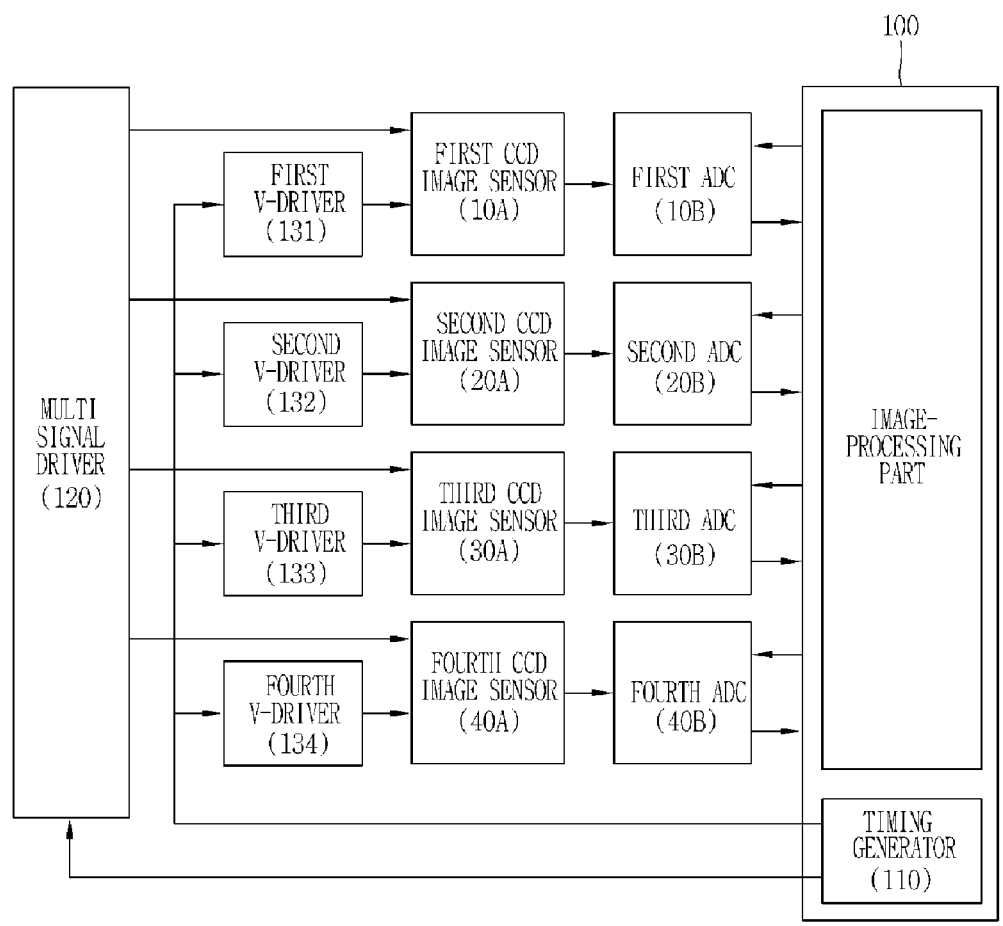
FIG. 7 is a view illustrating that the timing generator sends out the timing signal to the four CCD image sensors.

FIG. 7 is a view illustrating that the timing generator sends out the timing signal to the four CCD image sensors.

Referring to FIG. 7, operation of the timing generator 110 is now described.

The CCD image sensors 10A, 20A, 30A, and 40A output their respective Cy, Ye, Mg, and G information in the form of the analog signal to the A/D converters 10B, 20B, 30B, and 40B, respectively. The A/D converters 10B, 20B, 30B, and 40B convert the analog signals to the CYMG image signals, respectively, and output the CYMG image signals to the image-signal processor 100.

At this point, the timing generator 110 of the image-signal processor 100 sends out the timing signal for driving each of the CCD image sensors 10A, 20A, 30A, and 40A.

The timing generator 110 sends out a vertical timing signals to the V-drivers 131, 132, 133, 134 which are provided to the CCD image sensor 10A, 20A, 30A, and 40A, respectively and send out a horizontal timing signal to a multi signal driver 120. This is done to enable the CCD image sensors to receive the timing signals, each with the same phase from the timing generator 110.

Prevention of timing signal attenuation due to the fan-out status is the reason for providing the V-drivers 131, 132, 133, and 134 to the image sensors 10A, 20A, 30A, and 40A, respectively.

At the same time, the timing generation 110 sends out the horizontal timing signals RG (CCD Reset Gate pulse), H1 (CCD Horizontal driving pulse 2), and H2 (CCD Horizontal driving pulse 1), which are important control signals, through the dedicated multi signal driver 120 to the CCD image sensor 10A, 20A, 30A, and 40A, In response to these timing signals, the CCD imager sensors output their respective Cy, Ye, Mg, and G information in the form of an analog signal to the A/D converters 10B, 20B, 30B, and 40B. The image-signal processor 100 either horizontally or horizontally and vertically combines the four images using the four CYMG image signals input from the A/D converters 10B, 20B, 30B, and 40B.

Figure 8:
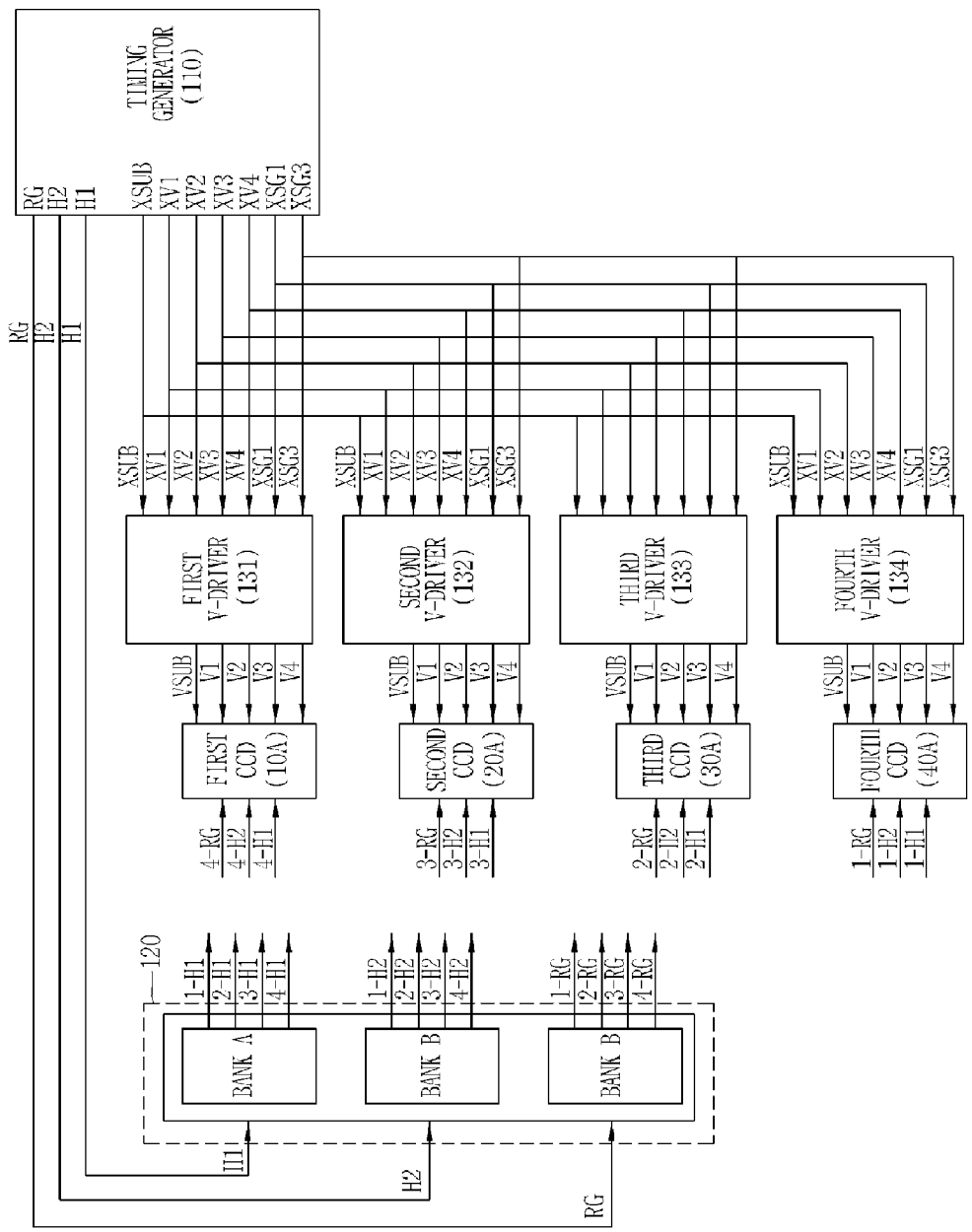
FIG. 8 is a view illustrating that one timing generator provided on the image-signal processor according to the present invention sends out a timing signal to each of the CCD image sensors.

Referring to FIGS. 7 and 8, operation of the timing generator 110 is now described.

The timing generator 110 generates the timing signal for driving the CCD image sensors. That is, the timing generator 110 generates RG signal, H2 signal, and H1 signal which are to be sent out to the multi signal driver 120, and generates XSUB (CCD shutter speed control pulse), XV1 signal, XV2 signal, XV3 signal, XV4 signal, XSG1 (CCD Read out pulse 1) signal and XSG3 (CCD Read out pulse 2) signal which are to be sent out to their respective V-drivers 131, 132, 133, and 134.

RG, H1, and He signals are for sending out Cy, Ye, Mg, and G information from the CCD image sensor through the A/D converters to the image-signal processor 100. That is, the H1 and H2 signals are horizontal timing sync signals for horizontally shifting a component of the image signal, and the RG signal is for sending out the image signal from the CCD image sensor.

At this point, when the timing generator 110 sends out the RG, H1, and H2 signals at the same time to each of the CCD image sensors, the fan-out status that the CCD image sensors are not driven due to current shortage occurs. To solve this problem, the multi signal driver 120 is required. The multi signal driver 120 consists of three (1×4) (1-input, 4-output) drivers (banks A, B, and C). As shown in FIG. 8, each of 1×4 (1-input, 4-output) drivers receives one of the RG, H1, and H2 signals, (this is referred to as "1-input") and outputs the received signals, each with the same relevant level, to the four CCD image sensors (this is referred to as "4-out"). The RG, H1, and H2 signals should have relevant-level current to prevent the fan-out status, because the CCD image sensor is current-driven.

Each of the V-drivers 131, 132, 133, and 134 receives XSUB signal, XV1 signal, XV2 signal, XV3 signal, XV4 signal, XSG1 signal, and XSG3 signal from the timing generator 110, and sends out CCD Timing Sync-Vertical signal (VSUB, V1 (CCD Vertical driving pulse phase-1), V2 (CCD Vertical driving pulse phase-2), V3 (CCD Vertical driving pulse phase-3), V4 (CCD Vertical driving pulse phase-4)) to each of the CCD image sensors. That is, the V-driver enables the CCD timing sync vertical signal to have a vertical high voltage (+15V, −9V) which is required to drive the CCD image sensor. That is, the V-driver provides the high voltage signal to the CCD imager sensor, thereby preventing the fan-out status from occurring.

The image-signal processor according to the present invention provides an advantage that a plurality of images captured by a plurality of CCD image sensors can be vertically and /or vertically combined into a single image for one TV display, by enabling a single timing generator 110 to provide timing signals, each with the same phase, to the CCD image sensors, in order for each CCD image sensor to output the captured-image signal to its corresponding A/D converter. This makes it possible to remove the need for additional installation of the image-signal processor and to make compact a configuration of a monitoring system in which to install a plurality of the image-signal processors.

There are two typical applications of the present inventions; a monitoring system and a car black box (drive data recorder).

In the conventional CCTV camera system, one CCD image sensor covers one area in one direction. However, the image-signal processor according to the present invention supports two or more CCD image sensors. A CCTV camera can be equipped with one image-signal processor and two CCD image sensors installed opposite to each other to cover front and rear areas, thereby reducing the cost for manufacturing and maintenance.

A car black box (drive data recorder) can be equipped with one image-signal processor and two CCD image sensors, one to cover an area in front of the car and the other to cover the inside of the car.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

The invention claimed is:

1. An image-signal processor capable of supporting a plurality of CCD image sensors, comprising:
   a timing generator providing timing signals, each with a same phase, to at least two of the CCD image sensors, to enable each of the CCD image sensors to output captured-image data in a form of an analog signal that a corresponding A/D converter converts into a CYMG signal;
   at least two image-processing parts, each of which receives the CYMG image signal from the A/D converter and converts the CYMG image signal into an YCbCr signal through application of color interpolation;
   an image-combination part combining horizontally or vertically at least two images being in a form, of the YCbCr signal into a combination image and then storing the combination image in an internal memory, and, at a same time, scaling down horizontally or vertically the combination image while reading out the combination image from the internal memory, storing the scaled-down combination image in an external memory, and then outputting the scaled-down combination image in the form of an YCbCr signal from the external memory; and
   an image-conversion part converting the YCbCr signal to an YUV signal.

2. The image-signal processor capable of supporting a plurality of CCD image sensors, according to claim 1, wherein the image-combination part comprises a horizontal-combination part that horizontally combines two images being in the form of the two YCbCr signals into a horizontal-combination image and then storing the horizontal-combination image in the internal memory, and, at the same time, scaling down horizontally the horizontal-combination image while reading out the horizontal-combination image from the internal memory, storing a scaled-down horizontal-combination image in the external memory, and then outputting the scaled-down horizontal-combination in the form of an YCbCr signal from the external memory.

3. The image-signal processor capable of supporting a plurality of CCD image sensors, according to claim 1, wherein the image-combination part comprises:
   two horizontal-combination parts, each of which combines horizontally at least two images being in the form of the YCbCr signal into a combination image and then stores the combination image in the internal memory, and, at the same time, scales down horizontally the combination image while reading out the combination image from the internal memory, stores the scaled-down combination image in the external memory, and then outputs the scaled-down combination image in the form of an YCbCr signal from the external memory; and
   a vertical-combination part storing the two scaled-down horizontal-combination images being in the form of the two YCbCr signals into the internal memory, and at the same time scaling down the two scaled-down horizontal combination images while being read out from the internal memory, storing two scaled-down horizontal-combination images being vertically scaled down in the external memory, and then outputting a scaled-down horizontal-and- vertical combination image in the form of an YCbCr signal from the external memory.

4. A method for processing image signals using an image-signal processor capable of supporting a plurality of CCD image sensors, comprising:
   providing timing signals, each with a same phase, to at least two of the CCD image sensors, to enable each of the CCD image sensors to output captured-image data in a form of an analog signal that a corresponding A/D converter converts into the CYMG signal;

receiving the at least two CYMG image signals from the at least two A/D converters and converting a CYMG image signals into YCbCr signals through application of color interpolation;

combining horizontally or vertically at least two images being in the form of the YCbCr signal into a combination image and then storing the combination image in an internal memory, and, at a same time, scaling down horizontally or vertically the combination image while reading out the combination image from the internal memory, storing the scaled-down combination image in an external memory, and then outputting the scaled-down combination image in the form of an YCbCr signal from the external memory; and converting the YCbCr signal to an YUV signal.

5. The method for processing image signals using an image-signal processor capable of supporting a plurality of CCD image sensors, according to claim 4, wherein in the combining, the storing, the scaling and the outputting, two images being in the form of the two YCbCr signals is horizontally combined into a horizontal-combination image and then the horizontal-combination image is stored in the internal memory, and, at the same time, the horizontal-combination image is horizontally scaled down while the horizontal-combination image being read out from the internal memory, a scaled-down horizontal-combination image is stored in the external memory, and then the scaled-down horizontal-combination is output in the form of an YCbCr signal from the external memory.

6. The method for processing image signals using an image-signal processor capable of supporting a plurality of CCD image sensors, according to claim 4, wherein the combining, the storing, the scaling and the outputting comprises:

combining horizontally the at least two images being in the form of the YCbCr signal in pairs into a combination image and then storing the combination image in the internal memory, and, at the same time, scaling down horizontally the combination image in pairs while reading out the combination image in pairs from the internal memory, storing the scaled-down combination image in the external memory, and then outputting the scaled-down combination image in the form of an YCbCr signal from the external memory; and storing the two scaled-down horizontal-combination images being in the form of the two YCbCr signals into the internal memory, and at the same time scaling down the two scaled-down horizontal combination images while being read out from the internal memory, storing two scaled-down horizontal-combination images being vertically scaled down in the external memory, and then outputting a scaled-down horizontal-and-vertical combination image in the form of an YCbCr signal from the external memory.

* * * * *